(12) United States Patent
Kaiser

(10) Patent No.: US 8,402,479 B2
(45) Date of Patent: Mar. 19, 2013

(54) DEVICE CONTROL CALL ALLOCATION FOR EMBEDDED SYSTEM DESIGN

(76) Inventor: Adam Kaiser, Everett, WA (US)

( * ) Notice: Subject to any disclaimer, the term of this patent is extended or adjusted under 35 U.S.C. 154(b) by 182 days.

(21) Appl. No.: 13/050,897

(22) Filed: Mar. 17, 2011

(65) Prior Publication Data

US 2011/0247010 A1   Oct. 6, 2011

Related U.S. Application Data

(60) Provisional application No. 61/314,720, filed on Mar. 17, 2010.

(51) Int. Cl.
*G06F 13/00* (2006.01)
(52) U.S. Cl. ........................................ 719/321; 719/328
(58) Field of Classification Search .................. 719/321, 719/328
See application file for complete search history.

(56) References Cited

U.S. PATENT DOCUMENTS 6,934,711 B2 * 8/2005 Pooni et al. ............ 707/999.001
8,011,006 B2 * 8/2011 Suzuki et al. .................... 726/16

* cited by examiner

*Primary Examiner* — Andy Ho

(57) ABSTRACT

Methods and apparatuses for control call allocation in an embedded system environment are provided. Control calls are placed into groups, with each group having a globally unique identifier. Control calls within each group are assigned relative offset values. Subsequently, as control calls are allocated to hardware resources, such as, for example, during the initial setup of the embedded system or when hardware resources are added to the embedded system, a base offset for each group, and a request number, derivable from the base offset and the relative offset is allocated for each supported control call. Hardware resources may be accessed in a similar manner.

8 Claims, 6 Drawing Sheets

DEVICE CONTROL CALL ALLOCATION FOR EMBEDDED SYSTEM DESIGN

RELATED APPLICATIONS

This application claims priority under 35 U.S.C. §119(e) to U.S. Provisional Patent Application No. 61/314,720 entitled "IOCTL Allocations for Embedded System Design," filed on Mar. 17, 2010, and naming Adam Kaiser as inventor, which application is incorporated entirely herein by reference.

FIELD OF THE INVENTION

This invention relates to the field of embedded system design. Various implementations of the invention are applicable to allocating device control calls between various components of an embedded system.

BACKGROUND OF THE INVENTION

In general, an embedded system may be described as a special purpose computing system designed to perform one or a few dedicated functions. Embedded systems are commonly used in consumer devices like personal digital assistants, mobile phones, videogame consoles, microwaves, washing machines, alarm systems, and digital cameras. In addition to the consumer space, embedded systems are used in nearly every industry, from telecommunications to manufacturing, and from transportation to medical devices. In fact, embedded systems are so commonly in use today that it is not feasible to exhaustively list specific examples.

The term "embedded system" does not have a precise definition, and determining what is and is not an embedded system can be difficult. For example, a general purpose computer, such as a laptop, is not typically characterized as an embedded system. However, a laptop is usually composed of a multitude of subsystems such as the hard disk drive, the motherboard, the optical drive, the video processing unit, and various communication devices. Many of the individual subsystems comprising the laptop may themselves be embedded systems.

The complexity of embedded systems can vary from, for example, systems with a single microcontroller chip and a light emitting diode to systems with multiple microprocessor units and various peripheral communication interfaces and mechanical parts. Manufacturers of modern microprocessors are increasingly adding components and peripheral modules to their microprocessors, creating what may be thought of as embedded processors. This type of embedded system is often referred to as a system on a chip (SoC). A simple example of a system on chip is an application-specific integrated circuit (ASIC) packaged with a universal serial bus (USB) port. Additionally, embedded systems range from those having no user interface at all to those with full user interfaces similar to a desktop operating system.

There are many advantages to using embedded systems. For example, an embedded system typically is designed to do some specific task, as opposed to being a general purpose computer with a wide range of features for performing many different tasks. As a result, design engineers can optimize the embedded system for the desired task, which assists in reducing the size and cost of the device as well as increasing its reliability and performance. Furthermore, functionalities can be designed into an embedded system that would not be feasible using hardware alone.

The software that operates an embedded system is generally referred to as "firmware." Firmware is often stored on read only memory ("ROM") based storage devices. For example, flash-based read only memory or electronically erasable read only memory ("EEPROM") devices are often used to store firmware. The firmware is used to control the various features, functioning, and interfaces of the embedded system. Thus, a digital video disk player will have firmware that processes the appropriate response to an input, such as the user pressing the "power" button or the "play" button. Additionally, the firmware in this example would control the storage mechanism, the digital processing circuitry used to decode and output onto the appropriate ports the video and audio signals stored on the video storage medium, as well as the user interface allowing the user to configure settings of the digital video disk player.

Modern embedded systems often allow the user to execute an additional application, commonly referred to as an "app," on the device. For example, an app may be loaded into a memory location accessible by the embedded system such that the app may be executed by the embedded systems firmware. As those of skill in the art will appreciate, apps interact with the various hardware components of the embedded system through control calls, sometimes referred to as input/output control (IOCTL) calls, which are made available by the firmware. As those of skill in the art will further appreciate, these various control calls allow software (e.g. an app) to cause the hardware components to perform specified functions, including sending inputs to and receiving outputs from the hardware components. Typically, the firmware will have a specified set of control calls, which application developers may reference when building applications for execution by the embedded system. Each system call is typically assigned an index number, commonly referred to as an IOCTL number, whereby the system call can be referenced.

In this manner, a particular hardware component may be accessed by addressing the hardware component and referencing the index number corresponding to a particular control call. As those of skill in the art will appreciate, it is often necessary to provide support for non-standard hardware components. As such, the control call system implemented by an embedded systems firmware must be extensible to allow for the addition of new hardware components and configuring these hardware components with existing or new control calls. Furthermore, it is often desirable that a control call (e.g. corresponding to a single index number) be supported by more than one hardware component. Under these conditions, the conventional techniques for assigning control call index numbers are insufficient for dealing with non-standard hardware components that must support the same control calls.

SUMMARY OF THE INVENTION

The invention provides methods and apparatuses for assigning control call index numbers. Particularly, various implementations of the invention are applicable to managing control call index numbers for use by an embedded operating system in controlling hardware resources.

In various implementations of the invention, control calls are placed into groups. Each group is assigned a globally unique identifier and a base offset. Furthermore, each control call within each group is assigned a relative offset. Each hardware resource device driver provides support for a single control call, which takes as input a globally unique identifier and returns a base offset for the control call group corresponding to the globally unique identifier. A request number may then be derived based upon the base and relative offset values. This request number may be used to access the hardware resource directly.

With some implementations, a user space application may access a hardware resource by first identifying a control call, a relative offset corresponding to the control call, and then querying the hardware resource to determine a base offset corresponding to the control call group to which the control call belongs. This may be facilitated by passing a globally unique identifier to the device driver for the hardware resource, wherein the base offset may be returned. Subsequently, a request number may be derived based upon the base offset and the relative offset. This request number may then be used to access the hardware device in the manner desired.

With various implementations, a hardware resource may be added to the embedded system by installing a device driver to embedded system kernel layer. during installation of the device driver, base offset for control call groups may be determined based upon the number of control call groups needing support by the hardware resource and the number of control call within each group.

These and additional aspects of the invention will be further understood from the following detailed disclosure of illustrative embodiments.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE EMBODIMENTS

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms like "generate" to describe the disclosed implementations. Such terms are often high-level abstractions of the actual operations that are performed. The actual operations that correspond to these terms will often vary depending on the particular implementation.

Illustrative Embedded System

Figure 1:
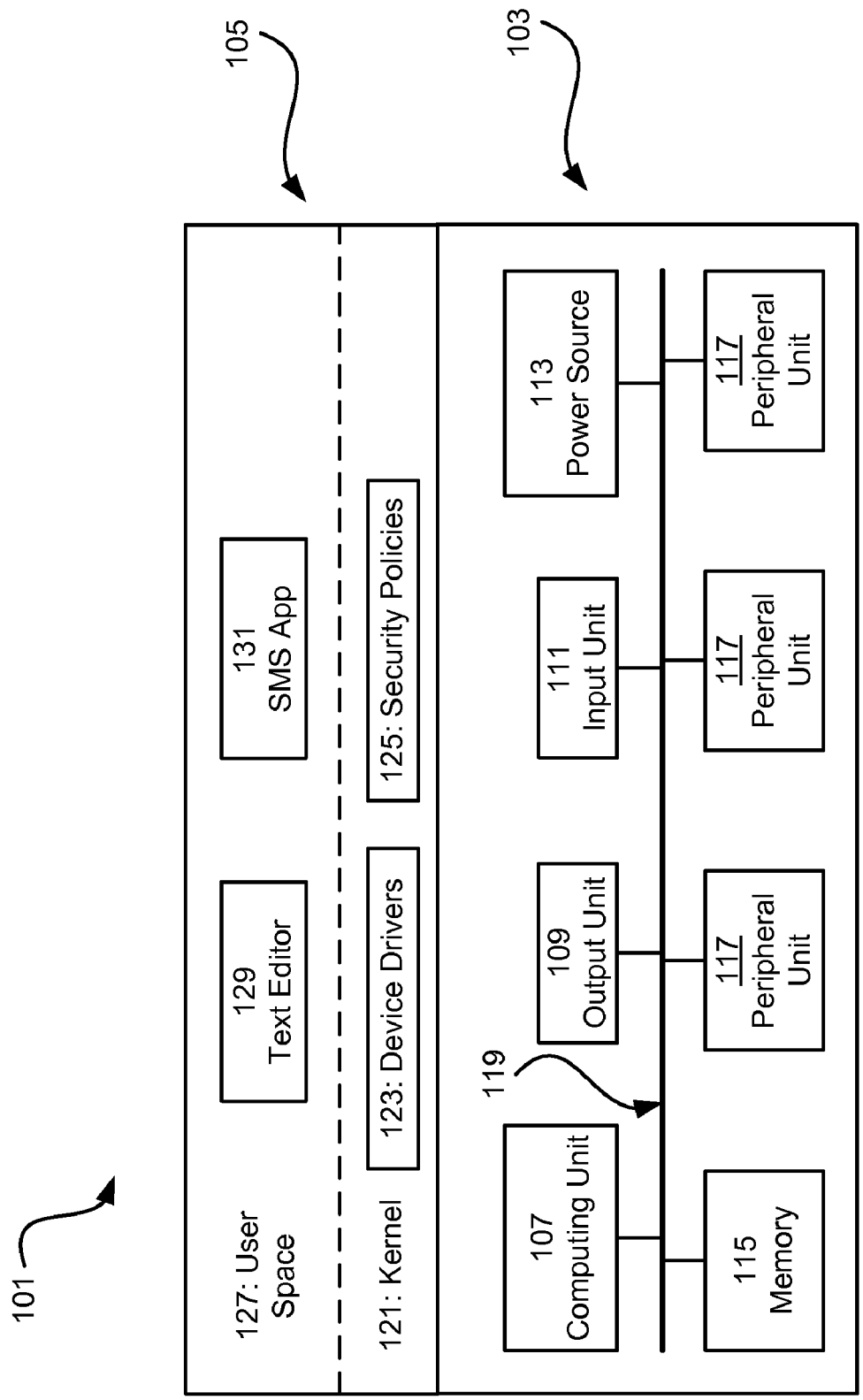
FIG. 1 illustrates an embedded system.

As the techniques of the present invention are directed towards managing control call resources in an embedded system, an illustrative embedded system is described herein. FIG. 1 illustrates an embedded system 101. As can be seen from this figure, the embedded system 101 includes both hardware 103 and software 105. As illustrated, the hardware 103 includes a computing unit 107, an output unit 109, an input unit 111, a power source 113, a memory 115 and a number of peripheral units 117. Those of skill in the art will appreciate that not all embedded systems include the features illustrated in FIG. 1. Furthermore, additional features, not illustrated in FIG. 1, may be present in an embedded system. For example, as stated above, an embedded system may be configured as a cell phone. Accordingly, peripheral units 117 configured for cellular communication would be included in the embedded system 101. As can be further seen from this figure, the various components of the embedded system are interconnected via a bus 119.

The software 105, which may also be referred to as the "firmware" or the "operating system" (OS), is typically stored on a non-transient memory component. More particularly, the software 105 may be stored on the memory 115. In this manner, the functionality "programmed" into the software 105 may be accessed and used to interact with and control the hardware 103 of the embedded system 101.

The software 105 is typically partitioned into two sections. As can be seen from this figure, the software 105 includes a kernel layer 121 and user space layer 127. The kernel layer 121 typically includes sensitive resources, such as, for example, device drivers 123 and system security policies 125 as shown. The user space layer 127 typically includes user applications and user configurable settings, such as, for example, a text editor 129 and a messaging application 131 as shown. As those of skill in the art will appreciate, most operating systems prevent applications running in the user space layer 127 from directly accessing resources in the kernel space layer 121. This safeguard prevents unauthorized access to sensitive system information and from accidental mismanagement of the system 101 by user space layer 127 applications.

Although the user space layer 127 is prevented from directly accessing the kernel layer 121, resource request of the kernel layer 121 by the user space layer 127 are often permitted. These requests are often referred to as "control calls" or "IOCTLs" as indicated above. Conventional operating systems include a number of different control calls. For example, a call to write some data to a memory location may be indicated by a "write( )" control call. Furthermore, the command to initiate control of a peripheral device 117 may be indicated by a "power( )" control call. Additionally, each control call is typically assigned an "index number." For example, the write( ) control call may be assigned index number 2 while the power( )control call may be assigned the index number 3. These control call index numbers are used in conjunction with a device driver 123 to interact with and, or alternatively, to configure ones of the hardware 103.

As stated above, hardware components are typically directly controllable only from within the kernel layer 121. More particularly, in order for the user space layer 127 to interact with the various hardware components, such as, for example, the output unit 109 or a one of the peripheral units 117, control calls through the kernel layer 121 must be made. For example, if the output unit 109 were a High-Definition Multimedia Interface (HDMI) port, then it may be necessary to configure the output resolution and whether video or both video and audio should be output through the HDMI port. Facilitating this configuration from the user space layer 127 may be done through the use of control calls.

As will be appreciated by those of skill in the art, many combinations and configurations of hardware may be provided in an embedded system. Furthermore, different hardware components may be connectable to an embedded system. Further still, the techniques of the present invention are applicable to all types of embedded systems and hardware. As such, where referencing hardware components of the embedded system, the term "hardware resource" will be used herein. It is to be understood that this encompasses various hardware components that may be provided by or connectable to an embedded system.

Figure 2:
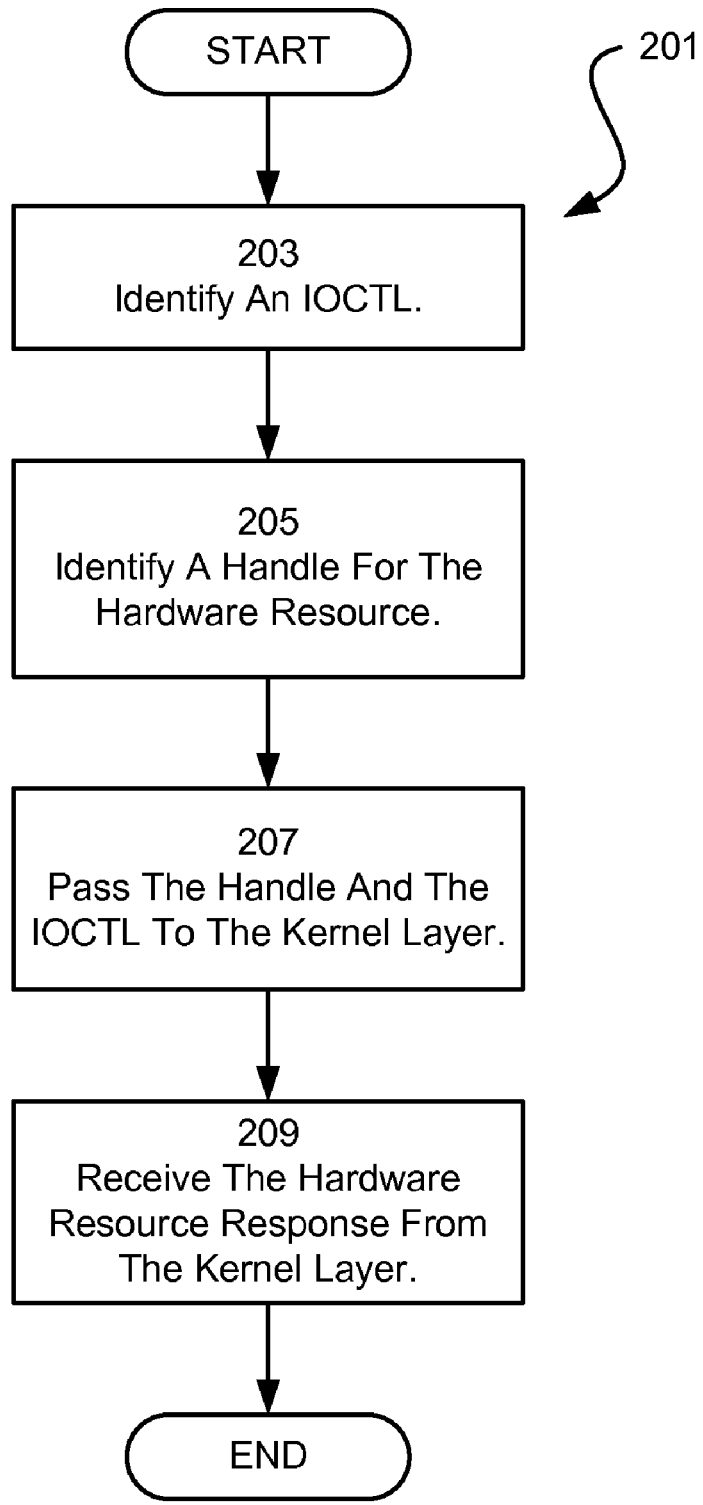
FIG. 2 illustrates a conventional method for allocating control calls.

FIG. 2 illustrates a conventional method 201 for accessing a hardware resource from the user space layer 127. As can be seen from this figure, the method 201 includes an operation 203 for identifying a control call (IOCTL). As stated previously, conventionally, control calls are assigned and index number, such as, for example, an integer, to uniquely identify each control call. The method 201 further includes an operation 205 for identifying a handle or name for the hardware resource to be accessed. As those of skill in the art will appreciate, different methods exist for accessing hardware resources. One typical method accesses a hardware resource similar to files. More particularly, when a hardware resource is accessed, a "handle" or "file name" is opened to represent the hardware resource. Then interaction to the hardware resource can be made through this file name or handle.

Subsequently, an operation 207 for passing the handle and control call (or control call index number) to the kernel layer 121 is provided. The following lists an example control call.

ioctl('Control Call Index Number', 'Result')

Where "Control Call Index Number" is the index number corresponding to the desired control call and result is a variable or location in memory where output (if any) from executing the control call can be stored. For example, to determine the size of the current terminal window in a Linux® operating system environment using a control call, the following command may used.

ioctl(1074295912L,'Result')

Where 1074295912L is the control call index number for the above described Linux® operating system ioctl.

As indicated above, it is often advantageous to allow for the functionality of an embedded system to be extended by adding new hardware resources. This is typically facilitated by adding a device driver 123 to the kernel space 121. As those of skill in the art will appreciate, a device driver is a set of computer executable software instructions that allow high-level interaction with a hardware resource. For example, interaction with a hardware resource from the user space layer 127. The device drivers are typically "installed" into the kernel layer 121 through a process that adds any necessary libraries needed to interact with the hardware resource and provides the necessary components to support the various control calls which the hardware resource is designed to support. Part of this process maps or allocates the various supported control call index numbers (i.e. that correspond to the supported control calls) to particular functions, often referred to as a "resource request number" or a "request number." The request numbers corresponds to an executable software function or functions detailed in the various libraries installed by the device driver.

Those of skill in the art will appreciate that extending the capabilities of the embedded system by adding new hardware resources is suitable provided that each group of control calls is treated as a unique set. However, where multiple hardware resources need support for a shared set of control calls, interference in control call index number allocation to request numbers may arise. For example, suppose that a control call that allows for each driver to report what version of the software 105 this particular device driver 123 was tested with last exists. Conventionally, this would be facilitated by adding a dedicated control call index number and for all hardware resources that support this control call implementing the control call index number into the device driver 123, which as detailed above would include each device driver associating a request number with the control call index number. Subsequently, the control call may be used as described above. However, this requires that the kernel space 121 determine a unique control call index number that is not used by any of the existing device drivers 123. This is often not feasible with the fixed control call index numbers system described above. Another conventional method proposed to address this issue is to assign a separate control call index number for each device driver. However, the user space layer 127 would then need to know which control calls numbers went with which drivers, which increases necessary resources and programming time.

Control Call Index Number Allocation

Figure 3:
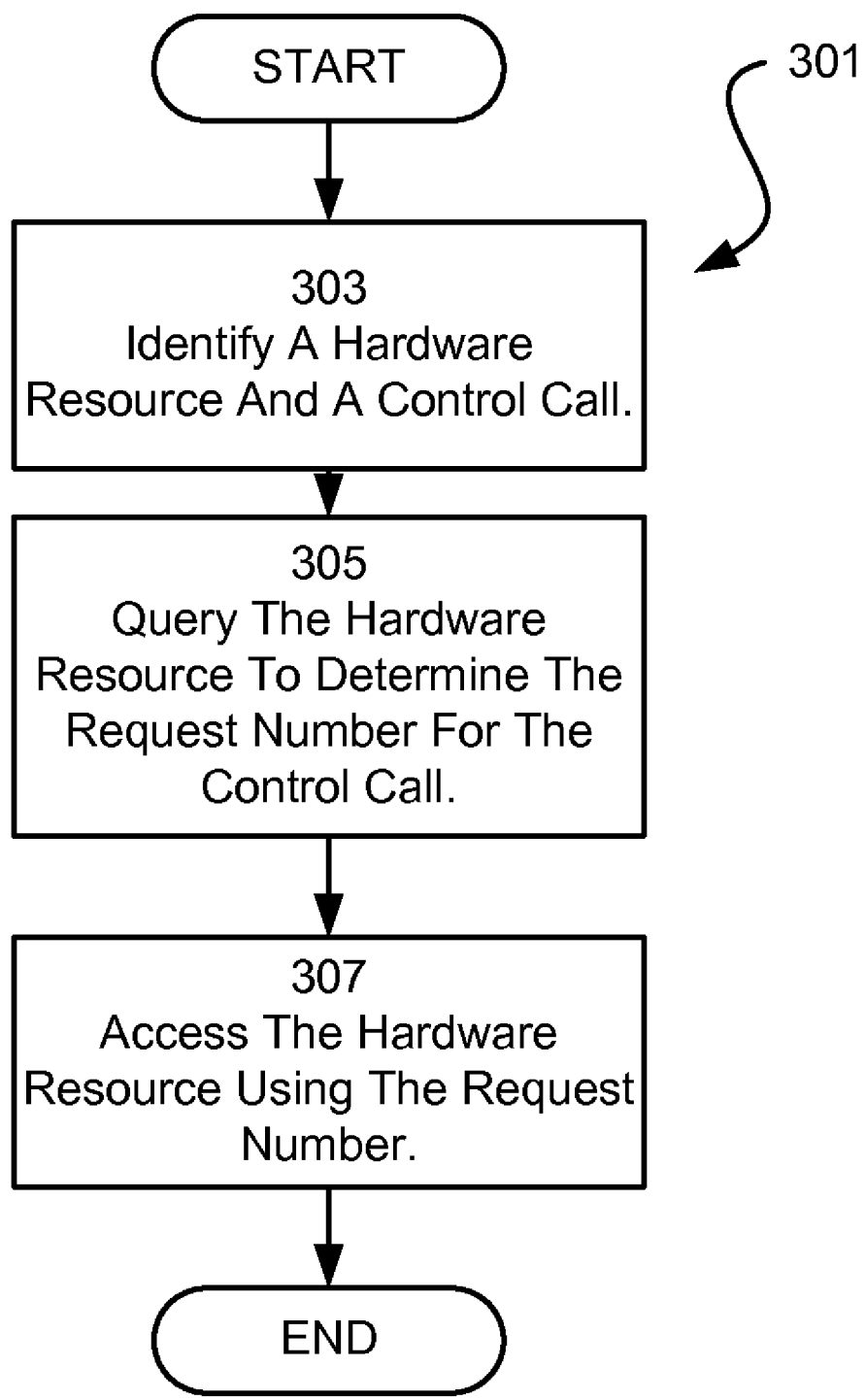
FIG. 3 illustrates a method for accessing a hardware resource using various implementations of the invention.
Figure 4:
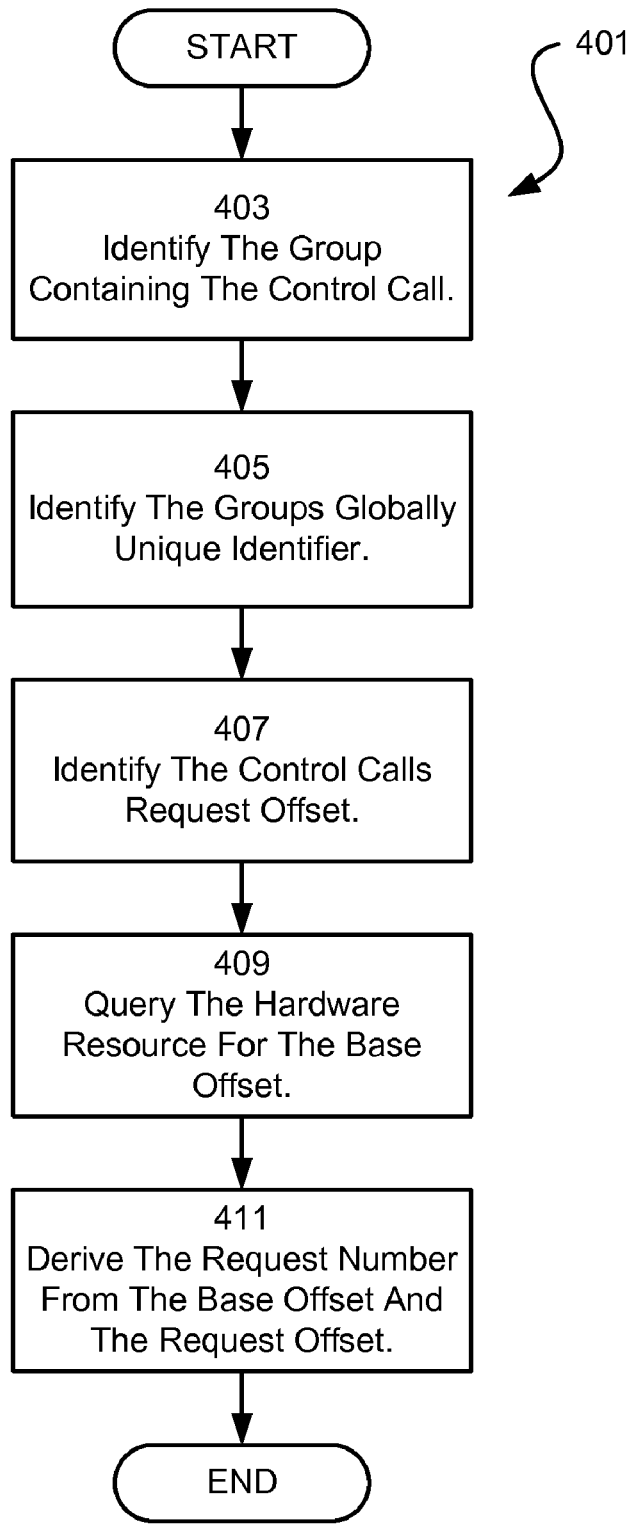
FIG. 4 illustrates a method for deriving a request number according to various implementations of the present invention.
Figure 5:
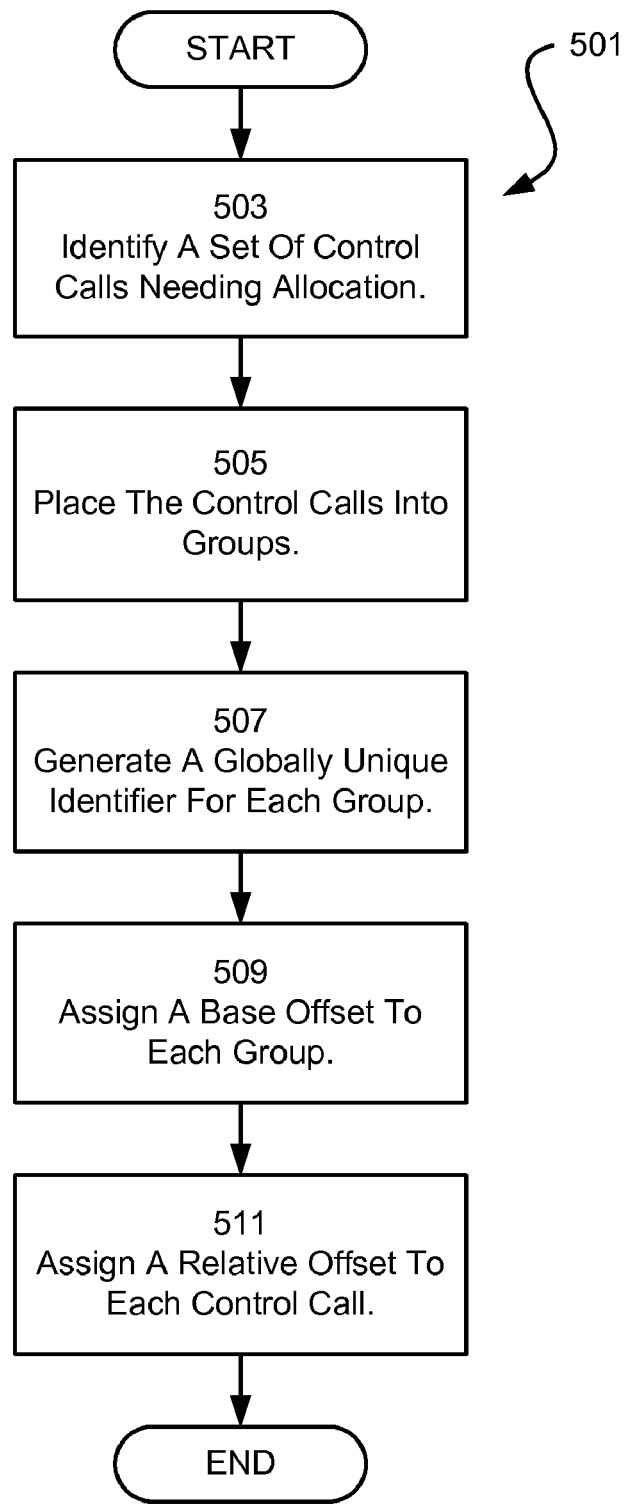
FIG. 5 illustrates a method for allocating control calls according to various implementations of the present invention.

FIG. 3 illustrates a method 301 for accessing hardware resources from the user space layer 127 that may be provided by various implementations of the present invention. FIG. 4 illustrates a method 401 for deriving a request number corresponding to a particular control call and hardware resource, which may be provided by various implementations of the present invention and used in conjunction with the method 301. FIG. 5 illustrates a method 501 for determining a control call index number allocation according to various implementations of the present invention. Reference to FIG. 3, FIG. 4, and FIG. 5 will be made in describing the various illustrative implementations of the invention detailed below.

As detailed above, various implementations of the invention provide a control call allocation schema that may be used to dynamically allocate new control calls, facilitate support for more than one hardware resource using the same control call, and allow for the extensibility of an embedded system. Various implementations of the invention rely on assigning control calls into classes or groups. Subsequently, each group will be assigned a globally unique identifier, and a base offset. Additionally, each control call will have a request number offset. This is illustrated in the following table.

TABLE 1

| Group A<br>Base Offset = 0 | | Group B<br>Base Offset = 3 | |
|---|---|---|---|
| Control Call 1 | Request Offset = 0 | Control Call 4 | Request Offset = 0 |
| Control Call 2 | Request Offset = 1 | Control Call 5 | Request Offset = 1 |
| Control Call 3 | Request Offset = 2 | Control Call 6 | Request Offset = 2 |

Table 1 shows a first control call group (i.e. Group A) and a second control call group (i.e. Group B). As can be further seen, each group has a base offset number, and each control call within the group has a request offset number. As noted above, each group will additionally have a globally unique identifier. This will be explained in greater detail below.

The method 301 includes an operation 303 for identifying a hardware resource to be accessed and a particular control call to use to access the hardware resource. In various implementations, the hardware resource and control call may be specified by a user of the embedded system. In alternative implementations, the hardware resource and control call may be dictated by the software executing in the user space layer 127.

An operation 305 is then provided for querying the hardware resource based upon the control call to determine a request number corresponding to the control call. As explained above, a request number is hardware resource specific and details how to implement the particular control call for that particular hardware resource. Subsequent to deriving the request number in the operation 305, an operation 307 is provided to access the hardware resource using the derived request number.

The method 401 may be provided to query a hardware resource to determine a request number. As can be seen, the method 401 includes an operation 403 for identifying the group containing the desired control call. As indicated above, the operation 303 identifies a particular hardware resource and control call. In the operation 403, the group containing this control call is identified. In various implementations, a look-up table is used to store control call grouping information. In alternative implementations, a database may be used to store control call grouping information.

An operation 405 is also provided for identifying a globally unique identifier for the control call group. More particularly, suppose that the desired control call were Control Call 2 shown in Table 1 above. Accordingly, the first control call group (i.e. Group A) would be identified. Table 1 further shows that this control call group has a globally unique identifier of 'A'. An operation 407 is also provided for identifying the request offset corresponding to the desire control call, which in this example case, is the number 1.

The method 401 subsequently provides an operation 409 for querying the hardware resource to determine a base offset. As will be explained in greater detail below, the base offset is assigned by each device driver 123 when it is added into the kernel layer 121. Furthermore, each hardware resource provides support for a single fixed control call index number. This control call with the fixed index number takes as input a globally unique identifier and returns a base offset number for the group of control calls corresponding to the globally unique identifier. As such, the operation 409 may be used to determine a base offset for the hardware resource, which corresponds to the desired control call group. Assignment of base offset numbers during installation of a device driver will be explained in greater detail below.

An operation 411 for deriving the request number corresponding to the desired control call and hardware resource is then provided. In various implementations, the request number is a numerical value that equals the base offset plus the request offset. As those of skill in the art will appreciate, there are a number of other equally suitable methods of encoding offset numbers, such as, for example, in hexadecimal, which may be substituted for the method detailed herein. The derived request number may then be used to access the hardware resource as explained above in conjunction with the method 301.

As indicated above, various implementations of the invention may be provided to allow for the addition or allocation of new control calls. The method 501 may be used to allocate new control calls as detailed herein. As can be seen, the method 501 includes an operation 503 for identifying a set of control calls (IOCTLs) that need allocation. More particularly, one or more control calls, which need control call index numbers associated within them are identified. Subsequently, an operation 505 for placing the control calls into groups is provided. In various implementations, one or more new groups are formed, which the control calls may then be placed into. As detailed above, a group may include more than one control call. Alternatively, in some cases, a group may be formed for a single control call.

Subsequently, an operation 507 for assigning a globally unique identifier (GUID) to each group is also provided. In some implementations of the invention, the globally unique identifier is a 32 character hexadecimal string. For example, '21EC2020-3AEA1069-A2DD0800-2B30309D' is one example of a 32 character hexadecimal string. Those of skill in the art will appreciate that various techniques exists for deriving a globally unique identifier. For example, the Universally Unique Identifier (UUID) standard details one such technique.

An operation 309 is then provided for assigning a base offset to each group and an operation 311 for assigning a relative offset for each control call within each group. In various implementations, the base offset is determined from the total number of control calls allocated in the various control call groups. More particularly, using Table 1 above as example, if a new control call group (e.g. Group C) were added, then the base offset for this group might be derived by determining the base offset of the preceding group (i.e. 3) and then adding the number of the control calls in this group (i.e. 3) which results in 6. As such, the base offset for the new Group C would be 6. Additionally, relative offset numbers may be determined in a similar manner as shown in Table 1. More specifically, if the new group, Group C, included a single control call, then the relative offset may be set as '0'.

It is important to note, as stated above, that the base offset for a particular control call group may differ from device driver to device driver. More specifically, as the base offsets are determined when the device driver is installed, then the base offsets may not be the same for each device driver. Accordingly, the method 501 may also be implemented when a device driver is installed. More specifically, the operation 509 may performed individually for each device driver installed, as the results from the operations 503 through 507 and the operation 511 may be reused from device driver install to device driver install.

Control Call Allocation System

Figure 6:
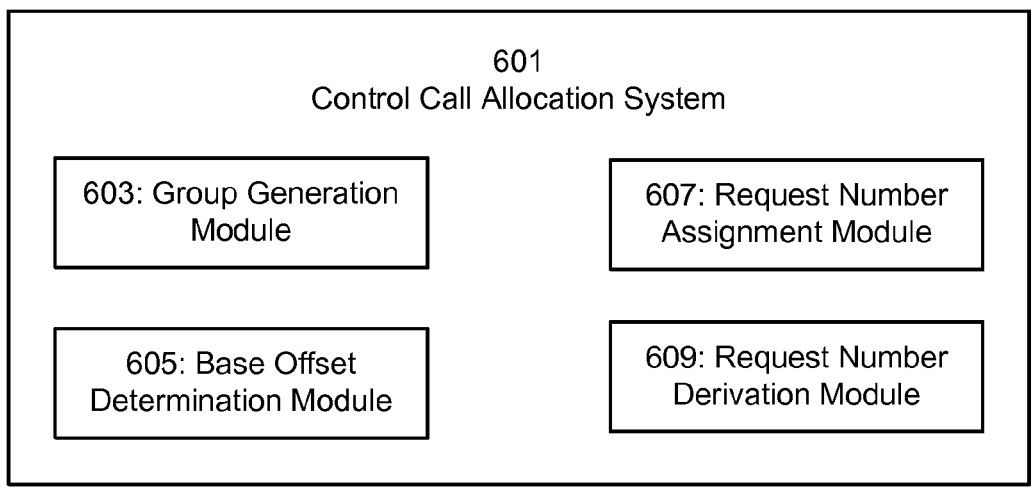
FIG. 6 illustrates a system for allocating control calls

FIG. 6 illustrates a control call allocation system 601 that may be provided by various implementations of the present invention. With some implementations, the system 601 may be provided as part of the kernel layer of the software component of an embedded system. As can be seen from this figure, the system 601 includes a group generation module 603 for generating control call groups. In various implementations, the module 603 may also place control calls into group and assign a globally unique identifier to each generated group. Additionally, the module 603 may assign relative offset values to each control call placed.

The system 601 also includes a base offset determination module 605 and a request number assignment module 607. As detailed above, when hardware resource is added to the embedded system, a base offset for each control call group is determined. Furthermore, a request number, derivable from the base offset and the relative offset. The module 605 may be configured to determine a base offset as detailed above, and the module 607 may be configured to associate request number for each supported control call as detailed above.

A request number derivation module 609 is also provided, which may be configured to derive a request number from a base offset and a relative offset. A detailed above, a base offset may be received from a hardware resource by querying the hardware resource with the globally unique identifier for the desired control call group. Subsequently, the module 609 may be used to derive the request number needed to access the hardware resource in the manner desired.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A computer-implemented method for allocating control calls, the method comprising:
   identifying a plurality of control calls needing allocation;
   generating one or more control call groups;
   assigning the plurality of control calls into the one or more groups;
   generating a globally unique identifier for each control call group;
   assigning a relative offset value to each of the control calls in each of the control call groups;
   identifying a hardware resource to be added to an embedded system; and
   determining a base offset value for each control call group, wherein the base offset values and the relative offset values may be used to derive a request number for each supported control call group.

2. The computer-implemented method recited in claim 1, the method act for generating a globally unique identifier for each control call group comprising:
   selecting a control call group needing a globally unique identifier;
   using an algorithm to derive a unique number; and
   associating the derived unique number as the globally unique identifier for that control call group.

3. The computer-implemented method recited in claim 2, wherein the globally unique identifier is a 32 character hexadecimal string.

4. The computer-implemented method recited in claim 1, the method act for assigning a relative offset value to each of the control calls in each of the control call groups comprising:
   selecting a control call group including control calls that need relative offsets; and
   assigning each control call within the group a different value.

5. The computer-implemented method recited in claim 4, wherein the relative offset values are numeric values.

6. The computer-implemented method recited in claim 1, the method action of determining a base offset value for each control call group comprising:
   selecting a control call group needing a base offset value;
   determining the number of control call groups having base offset values already;
   determining the number control calls within each of the control call groups having base offset values already; and
   assigning a value as the base offset of the control call group needing a base offset value based at least in part upon the number of control call groups having base offset values already and the number control calls within each of the control call groups having base offset values already.

7. The computer-implemented method recited in claim 1, further comprising:
   identifying a second hardware resource to be added to the embedded system; and
   determining a second base offset value for each control call group, wherein the second base offset values and the relative offset values may be used to derive a request number for each supported control call group for the second hardware resource.

8. The computer-implemented method recited in claim 7, wherein the base offset values and the second base offset values are different.

* * * * *